(12) United States Patent
Baird

(10) Patent No.: US 7,257,690 B1
(45) Date of Patent: Aug. 14, 2007

(54) LOG-STRUCTURED TEMPORAL SHADOW STORE

(75) Inventor: Robert Baird, San Jose, CA (US)

(73) Assignee: VERITAS Operating Corporation, Cupertino, CA (US)

( * ) Notice: Subject to any disclaimer, the term of this patent is extended or adjusted under 35 U.S.C. 154(b) by 344 days.

(21) Appl. No.: 10/966,968

(22) Filed: Oct. 15, 2004

(51) Int. Cl.
*G06F 12/16* (2006.01)

(52) U.S. Cl. ..................... 711/162; 707/204

(58) Field of Classification Search ............. 707/210, 707/204; 711/162
See application file for complete search history.

(56) References Cited

U.S. PATENT DOCUMENTS

| | | | |
|---|---|---|---|
| 5,261,088 A | 11/1993 | Baird et al. |
| 6,128,630 A | 10/2000 | Shackelford |
| 6,651,075 B1 | 11/2003 | Kusters et al. |
| 6,694,323 B2 | 2/2004 | Bumbulis |
| 6,732,125 B1 | 5/2004 | Autrey et al. |
| 6,792,432 B1 | 9/2004 | Kodavalla |
| 2005/0071379 A1 | 3/2005 | Kekre |

OTHER PUBLICATIONS

"A Guide To Understanding VERITAS Volume Replicator™," White Paper, VERITAS, p. 1-15, 2002.
Senicka, J., "A Guide To Implementing Cost Effective High Availability Techniques Using VERITAS Cluster Server," White Paper, VERITAS, p. 1-8, Aug. 2004.
Chamberlin, et al., "A History and Evaluation of System R," Communications of the ACM, vol. 24, No. 10, p. 632-646, Oct. 1981.
"VERITAS Storage Foundation™, Technical Overview," VERITAS, pp. i-32, Apr. 2002.
Rosenblum, et al, "The Design and Implementation of a Log-Structured File System", *Proceedings of the Thirteenth ACM Symposium on Operating System Principles*, Pacific Grove, CA, Oct. 13-16, 1991.
Sullivan, et al, "An Index Implementation Supporting Fast Recovery for the POSTGRES Storage System", *Proceedings of the Eighth International Conference on Data Engineering*, Tempe, AZ, Feb. 3-7, 1992.

*Primary Examiner*—Jack A. Lane
(74) *Attorney, Agent, or Firm*—Meyertons Hood Kivlin Kowert & Goetzel, P.C.; B. Noël Kivlin

(57) ABSTRACT

A log-structured temporal shadow store may comprise a logical storage aggregation including a plurality of blocks, a log-structured storage device, and shadow management software. The log-structured storage device may include a plurality of log entries, where each log entry includes one or more modified blocks of the logical storage aggregation and an index to the modified blocks. In response to a new batch of changes to the logical storage aggregation, the shadow management software may be configured to append a new log entry to the log-structured storage device, including newly modified blocks and an index to the newly modified blocks. The index may be organized as a modified B+ tree, and the log-structured storage device may be a logical volume, such as a mirrored logical volume.

28 Claims, 11 Drawing Sheets

Index Node Header 710

| Node Type (Root/Interior/Leaf) | 711 |
| Level Within Index (If Interior) | 712 |
| Lowest Volume Indexed | 713 |
| Lowest Block Offset Indexed Within Lowest Volume | 714 |
| Key-pointer Entry Count | 715 |
| Merge Point | 716 |
| . . . | |

FIG. 7

LOG-STRUCTURED TEMPORAL SHADOW STORE

BACKGROUND OF THE INVENTION

1. Field of the Invention

This invention relates to computer systems and, more particularly, to storage management within computer systems.

2. Description of the Related Art

Many business organizations and governmental entities rely upon applications that access large amounts of data, often exceeding a terabyte or more of data, for mission-critical applications. A variety of different storage devices, potentially from multiple storage vendors, with varying functionality, performance and availability characteristics, may be employed in such environments. Numerous data producers (i.e., sources of new data and updates to existing data) and data consumers with different sets of storage access requirements may need to share access to the stored data. In some enterprise environments, hundreds or thousands of data producers and data consumers may be operating at any given time. Sustained update rates on the order of tens to hundreds of gigabytes per hour may need to be supported in large enterprise data centers, with spikes of even higher levels of I/O activity. In some environments, furthermore, access patterns may be skewed towards the most recently updated data: that is, instead of being uniformly spread over the entire data set, a relatively large proportion of write and read requests may be directed at a "working set" of recently modified data.

As the heterogeneity and complexity of storage environments increases, and as the size of the data being managed within such environments increases, providing a consistent quality of service for storage operations may become a challenge. Quality of service requirements may include the ability to predictably sustain performance levels (e.g., I/O throughput for applications such as database management), data integrity requirements, and the ability to recover rapidly from application, host and/or device failures. At the same time, advanced storage features, such as temporal storage management (i.e., the ability to view and/or update data as of specified points in time), replication, and archival capabilities, may also be a requirement for enterprise-level storage environments.

Given the high data production rates described above, efficient update and search mechanisms, as well as appropriate capacity planning or sizing, may be essential for ensuring predictable performance. In a typical production environment supporting applications such as database management servers and file systems, servers providing access to the storage devices may be sized and/or configured based on an a model that may incorporate expected I/O workloads (e.g., the typical number of concurrent I/O clients, typical ratios of reads to writes, etc.) for the applications. However, in addition to normal read and write operations performed on behalf of such applications, advanced storage features, such as storage archival, replication, frozen image or point-in-time versioning, and backup, may also impact the load experienced by the production servers. Such advanced storage features may be hard to include within sizing estimates for storage servers for a variety of reasons, for example because the resources required to replicate a set of volumes may increase over time (e.g., as the amount of source data for the replication grows) and may vary with the characteristics of the replication destination (e.g., the speed with which data may be transmitted to and copied at the destination, which may in turn depend on the physical location of the destination devices). It may therefore be desirable to separate production workloads from advanced storage feature workload, to minimize the impact of implementing advanced storage features upon production server performance.

In addition to the performance problems outlined above, the potential for data corruption may also increase with the size and complexity of an enterprise storage environment. While numerous vendors attempt to provide solutions to the well-known external sources of data corruption, such as malicious intruders, worms, viruses etc., the very complexity of managing large collections of storage devices may also increase the probability of inadvertent data corruption due to internal sources in some cases. One source of inadvertent data corruption may arise due to multiple users being authorized to write to a given production data storage device for different purposes. For example, a database administrator may be in charge of expanding the underlying storage space used by a database management system (e.g., by enlarging a logical volume or adding more logical volumes), and a file system administrator may be in charge of creating a clone or a replica of a file system. If the storage devices being targeted by the two administrators for their respective operations happen to overlap (e.g., if a portion of the same disk is used by both), data corruption may result. Both administrators may have been granted high levels of authorization (e.g., "root" access in Unix-like systems), allowing one to overwrite the data of the other, and to potentially damage production data. In order to reduce the chances of data corruption from both external and internal sources, and to more easily identify a cause in the event data corruption does occur, it may be useful to place restrictions on the ability to modify production data, for example by allowing production data to be modified directly only from a small set of trusted processes or hosts.

The requirements for high sustained performance, stability and predictability, advanced features such as temporal data management, replication, archival, and frozen image services, combined with the need for improved data integrity, may place a high burden on storage system managers. Mechanisms and services that support high throughputs for updates and efficient data sharing, while at the same time decoupling production systems from advanced storage feature workload, and limiting the ability to corrupt production data, may therefore be highly desirable in enterprise-level storage environments.

SUMMARY OF THE INVENTION

Various embodiments of a log-structured temporal shadow store are disclosed. According to a first embodiment, a shadow store may comprise a logical storage aggregation including a plurality of blocks, a log-structured storage device, and shadow management software. The logical storage aggregation may be any related set of data, such as a collection of one or more volumes storing the data of a file system or a database management system. The log-structured storage device may include a plurality of log entries, where each log entry includes one or more modified blocks of the logical storage aggregation and an index to the modified blocks. In response to a new batch of changes to the logical storage aggregation, the shadow management software may be configured to append a new log entry to the log-structured storage device, including newly modified blocks and an index to the newly modified blocks. The index may be organized as a modified B+ tree, and the log-structured storage device may be a logical volume, such as a mirrored and/or striped logical volume.

In one embodiment, the log-structured storage device may include a current-pointer indicative of a current log entry, and each log entry may include a previous-pointer indicative of a previous log entry. When appending a new log entry to the log-structured storage device, the shadow management software may be configured to set the previous-pointer of the new log entry to the current-pointer of the log-structured storage device, and to then set the current-pointer to the new log entry. Each log entry may also contain a timestamp indicative of a time at which the corresponding updates are made or committed. In this manner, the log-structured storage device may represent a set of successive temporal versions or generations of the logical storage aggregation, with the current log entry representing the most recent version, and previous versions or generations being accessible via the previous pointers. Each log entry may also contain a next-pointer to the next log entry, allowing a sequential traversal of versions in temporal order. The index for a new log entry may be created by traversing a previous index (i.e., an index from a previous log entry), copying some index entries from the nodes of the previous index, and updating or creating new index entries as needed. During the copying, obsolete index entries from the previous index may be omitted, i.e., obsolete index entries may not be copied to the new index.

According to another embodiment, a system may include a logical storage aggregation including a plurality of blocks, a data producer, a log-structured storage device, and shadow storage manager. The shadow storage manager may be configured to maintain one or more entries in the log-structured storage device, where each entry contains one or more modified blocks of the logical storage aggregation and an index to the one or more modified blocks. In response to a new batch of write operations targeted at the logical storage aggregation by the data producer, the shadow storage manager may be configured to append a new entry to the log-structured storage device.

BRIEF DESCRIPTION OF THE DRAWINGS

FIG. 7 is a block diagram illustrating the contents of an index node header according to one embodiment.

Figure 1:
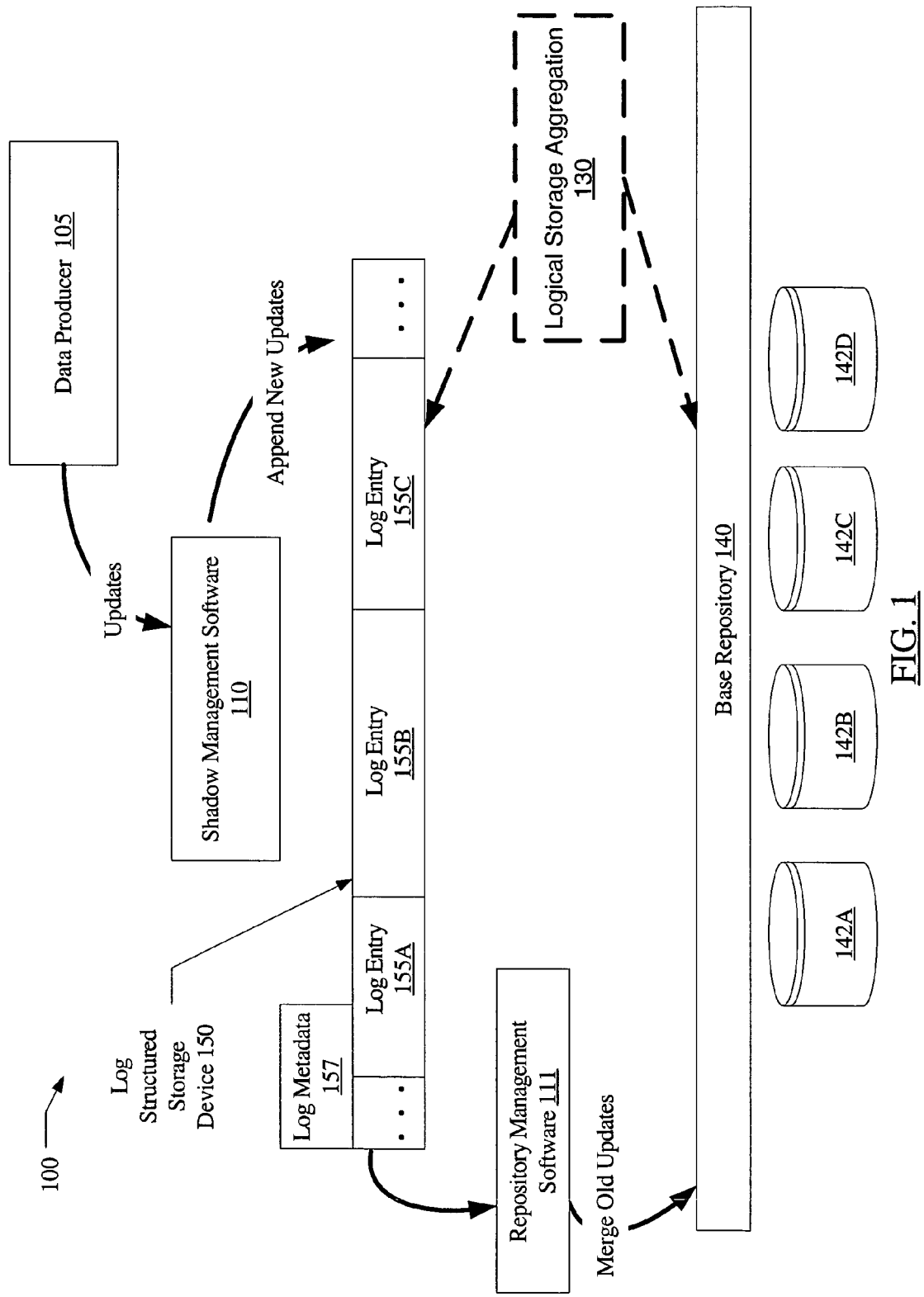
FIG. 1 is a block diagram of a system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram of a system 100 according to one embodiment. The system includes a data producer 105, a base repository 140, physical storage devices 142A-D, and a shadow store comprising a logical storage aggregation 130, a log-structured storage device 150, shadow management software 110, and repository management software 111. As shown, log-structured storage device 150 comprises log entries 155A, 155B and 155C (which may be referred to collectively as log entries 155), as well as log metadata 157. Data producer 105 may be configured to send batched updates to the data blocks of logical storage aggregation 130 to shadow management software 110. Shadow management software 110 may be configured to append a new log entry 155 containing the newly updated data blocks to log-structured storage device 150. Repository management software 111 may be configured to merge older updates with base repository 140, and to remove merged log entries from log-structured storage device 150 over time, as described in further detail below.

The term "shadow" (e.g., as used in "shadow store" and "shadow management"), as used herein, generally refers to a technique of maintaining more than one version of an object, including a "current" version and a "shadow" version. Shadow techniques may be used, for example, as a method of providing recovery in transaction-oriented systems such as some database management systems. In such a database management system, for example, two versions of an object such as an index may be maintained during the life of a transaction. At the start of the transaction, the current version and the shadow version may be identical. The shadow version, which may be read during the transaction, may never be modified during the transaction, and may be maintained in non-volatile storage. The current version may be modified in response to updates made during the transaction. When the transaction commits, the current version may be written to non-volatile storage, logically and/or physically replacing the shadow version. If the transaction is aborted or a system crash occurs during the transaction, the shadow version may be retrieved from non-volatile storage, allowing the state of the database prior to the start of the transaction to be recovered. The term "log-structured", as used herein, generally refers to a write-once, append-only storage organization, where updates and/or additions (e.g., newly allocated data blocks) to the data of a log-structured device are appended to the device instead of resulting in in-place modifications. It is noted that while updated data may only be appended rather than being modified in its original location, a log-structured storage device may contain some metadata that is modifiable in place. (It is noted that, as described in further detail below in conjunction with the descriptions of FIG. 8 and FIG. 9, metadata associated with log-structured storage device 150 may not be modified in place without preserving a previous version.)

Logical storage aggregation 130 may be any related set of data that may be managed as a unit, such as a collection of one or more volumes. In some embodiments, the volumes included within a logical storage aggregation 130 may be logical volumes, while in other embodiments, they may be physical volumes (e.g., disks or disk partitions) or a combination of logical and physical volumes. Such a collection of volumes may, for example, contain a file system (i.e., a file system may be built using the logical volumes), or a collection of database tables and associated metadata. A data block of logical storage aggregation 130 may therefore be addressable by a combination of a volume identifier (which may be expressed internally as a volume number for uniqueness and/or space efficiency, instead of using a volume name), and an offset within the volume, which may, for example, be expressed in storage sectors or in blocks.

Figure 2:
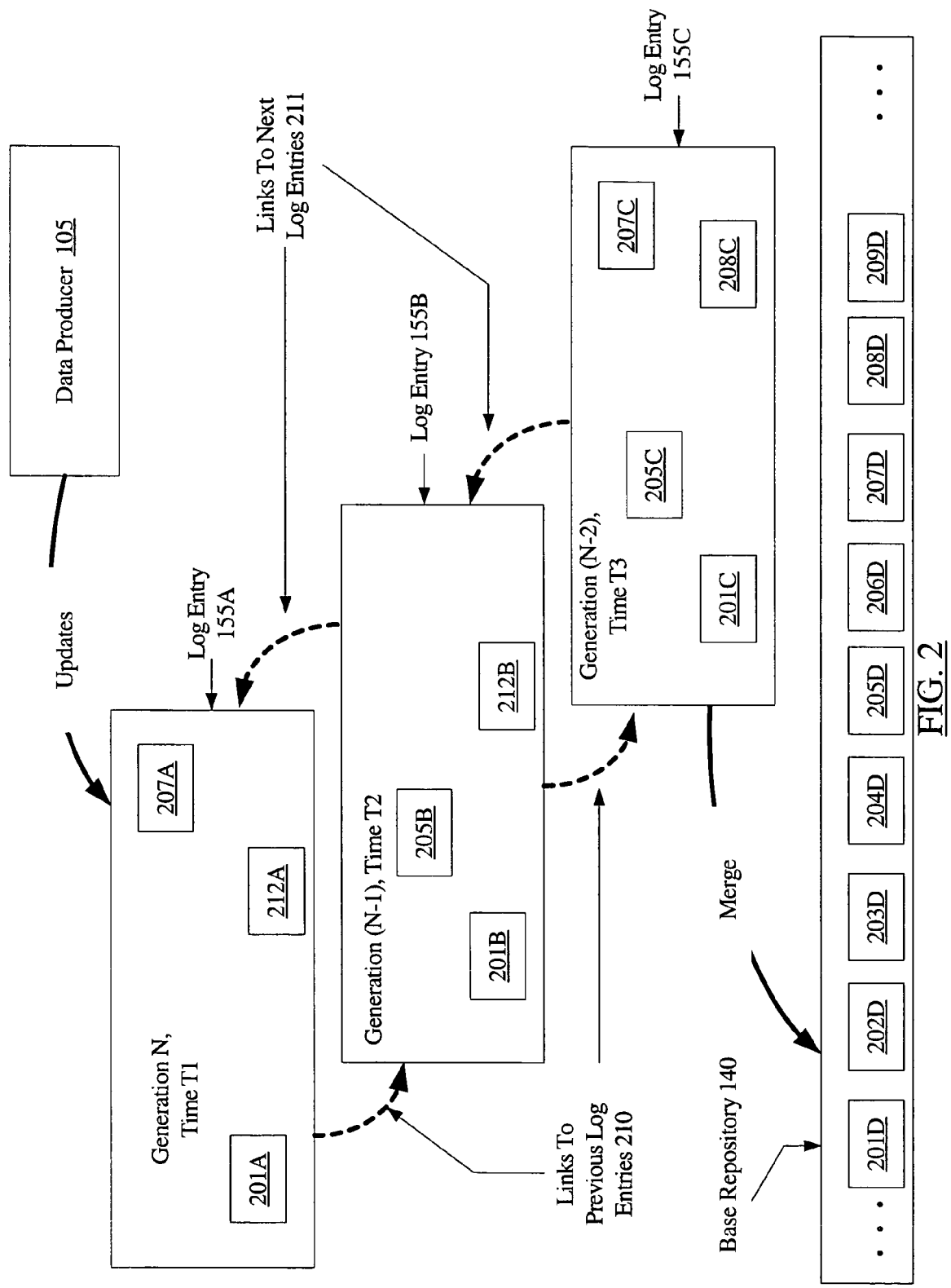
FIG. 2 is a block diagram illustrating temporal relationships between successive log entries and a baseline repository according to one embodiment.

FIG. 2 is a block diagram illustrating temporal relationships between successive log entries 155 and baseline repository 140 according to one embodiment. As described below in further detail in conjunction with the description of FIG. 3, each log entry 155 may contain a number of recently modified blocks of logical storage aggregation 130, as well as metadata and index information on the blocks. Each log entry 155 may represent a new generation of changes to logical storage aggregation 130, as of a particular modification time. In FIG. 2A, for example, log entry 155A may contain modified blocks 201A, 207A and 212A, representing a generation "N", as of a modification time T1. Similarly, log entry 155B may contain modified blocks 201B, 205B, and 212B, representing an earlier generation "N−1" as of a time T2 (where T2 is earlier than T1). Thus, block 201B may represent an earlier version of block 201A, and block 212B an earlier version of block 212A. Log entry 155C may represent a generation "N−2", with modified blocks 201C, 205C, 207C, and 208C representative of changes made at a time T3, where T3 is earlier than T2. Each log entry 155 may be logically linked to previous and next log entries via links 210 and 211, and each log entry 155 may contain only a subset of the blocks of logical storage aggregation 130.

A baseline version of logical storage aggregation 130 (consisting of blocks 201D, 202D, 203D, etc.) may be maintained in base repository 140, which may be physically stored within a subset of physical storage devices 142. In some embodiments, the baseline version may represent a complete version of logical storage aggregation 130 as of the last time a log entry 155 was merged with base repository 140 by repository management software 111. Any given block of storage aggregation 130 may be obtained either from an entry 155 of log-structured storage device 130, which may contain a recently-updated version of the given block, or from base repository 140, which may contain a version that has not been updated recently enough to be found within log-structured storage device 130. Log-structured storage device 130 may therefore be considered a temporal cache containing recent updates to data of logical storage aggregation 130 stored within base repository 140. Base repository 140 may be considered a dense, sequentially accessible version of logical storage aggregation 130, while log-structured storage device 150 may represent a sparse, randomly accessible subset of logical storage aggregation 130. In some embodiments, advanced storage functionality such as archival and replication may be performed by repository management software 111 using base repository 140, thus separating the I/O workload related to the advanced storage functionality from the I/O workload related to updates from data producers 105. Entities other than repository management software 111 (e.g., data producers 105, shadow management software 110, and data consumers or readers) may be provided read-only access to base repository 140, thus reducing possible sources of data corruption within base repository 140.

Figure 3:
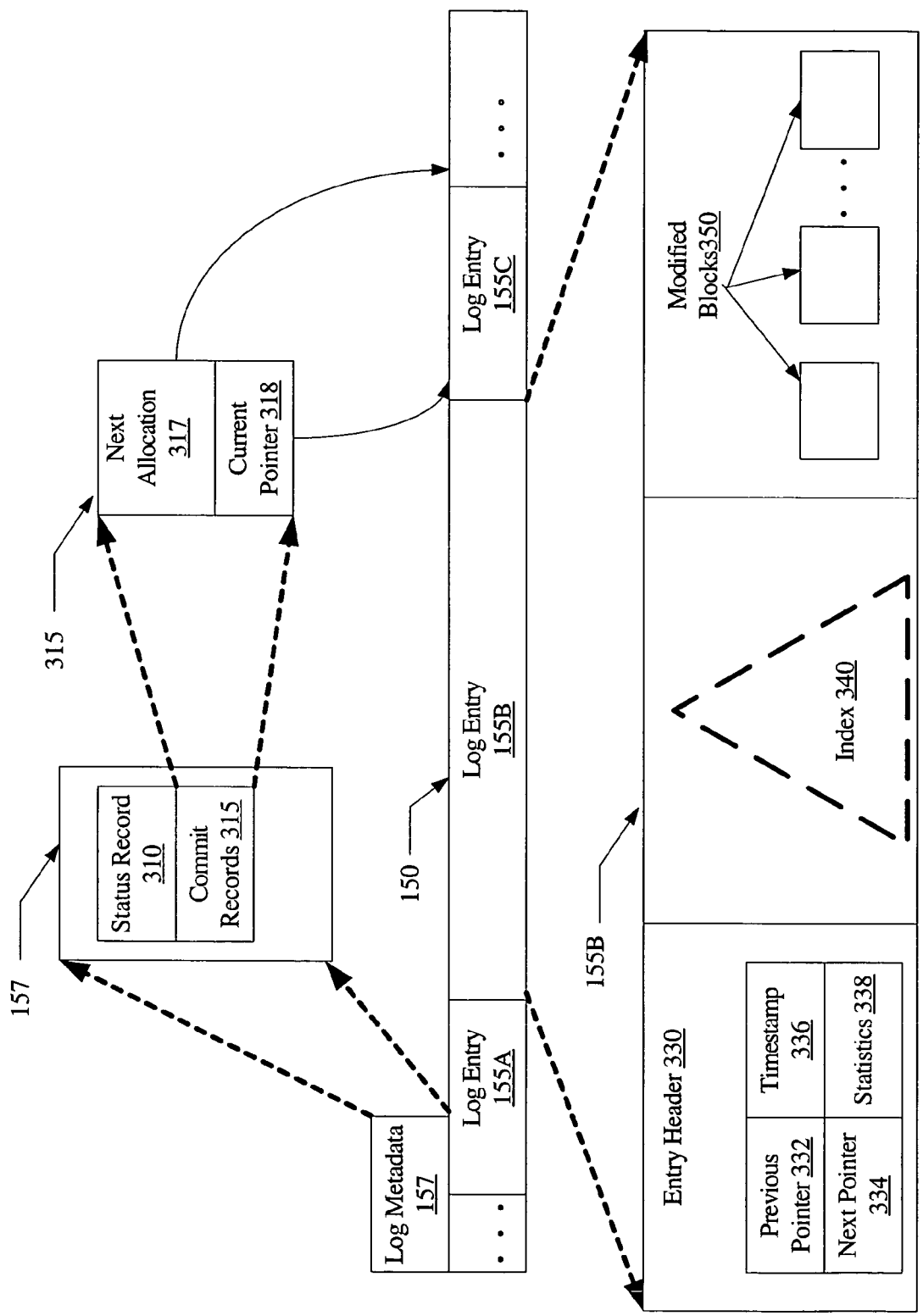
FIG. 3 is a block diagram illustrating the components of a log-structured storage device and its constituent log entries according to one embodiment.

FIG. 3 is a block diagram illustrating the components of log-structured storage device 150 and its constituent log entries 155 according to one embodiment. As shown, log metadata 157 may comprise a status record 310 and one or more commit records 315. Status record 310 may include a variety of status information for log-structured storage device 150, including for example pointers to the start and end of space allocated for log-structured storage device 150, pointers to the most recently merged log entry 155, a timestamp indicative of the last modification to log-structured storage device 150, etc. Commit records 315 may include a current pointer 318 to the most recently committed log entry 155, and a next allocation pointer 317 to the next available allocated space within log-structured storage device 150 (i.e., an offset where a next log entry 155 may be appended).

Each log entry 155 may contain three kinds of information in the depicted embodiment: an entry header 330, an index 340, and a set of one or more modified blocks 350 (i.e., modified blocks of logical storage aggregate 130, such as blocks 201A, 207A, 212A shown in FIG. 2). As shown for entry 155B, an entry header 330 may contain a previous pointer 332 (corresponding to a link 210 of FIG. 2) and a next pointer 334 (corresponding to a link 211 of FIG. 3), respectively pointing to a previous log entry (e.g., 155A) and a next log entry (e.g., 155C) within log-structured storage device 150. In addition, entry header 330 may also contain one or more timestamps 336 indicative of a time at which the corresponding entry 155 was created or committed, as well as statistics or accounting information 338. Index 340 may be used to speed up searches for recently modified data blocks 350 of logical storage aggregation 130 based on block address, as described below in further detail. Numerous modified data blocks 350 may be included within a log entry 155, corresponding to a batch of updates made by a data producer 105. The manner in which updates requested by data producer 105 are grouped or batched may be configurable (e.g., via one or more input parameters provided to shadow management software 110) in some embodiments. For example, shadow management software 110 may be configured to batch all outstanding update requests received during a specified time interval (e.g., 100 milliseconds) within one log entry 155 in one embodiment. In other embodiments the size of a batch may be based on a combination of factors, such as a specified number of updated blocks per batch and a maximum delay between the time an update to a block is requested and the time it is committed in a log entry 155. In such an embodiment, for example, a log entry 155 may be created as soon as either condition is met: either the specified number of updated blocks has accumulated, or the maximum allowed delay has elapsed.

Previous pointers 332 and next pointers 334 support sequential access to the log entries 155 in order (or reverse order) of update times. Thus, for example, an application configured to create an image or copy of logical storage aggregation 130 as of a specified point in time may start with a repository version of logical storage aggregation and apply changes in log entry order (i.e., copy modified blocks 350 to the image starting with the earliest un-merged log entry, and continue copying modified blocks from successive log entries until the latest log entry prior to the specified point in time is reached). Another application configured to roll back to a previous version of logical storage aggregation 130 may start undoing block updates at the most recent log entry 155, and use previous pointers 332 to undo prior updates in reverse chronological order until the desired version is obtained.

Figure 4:
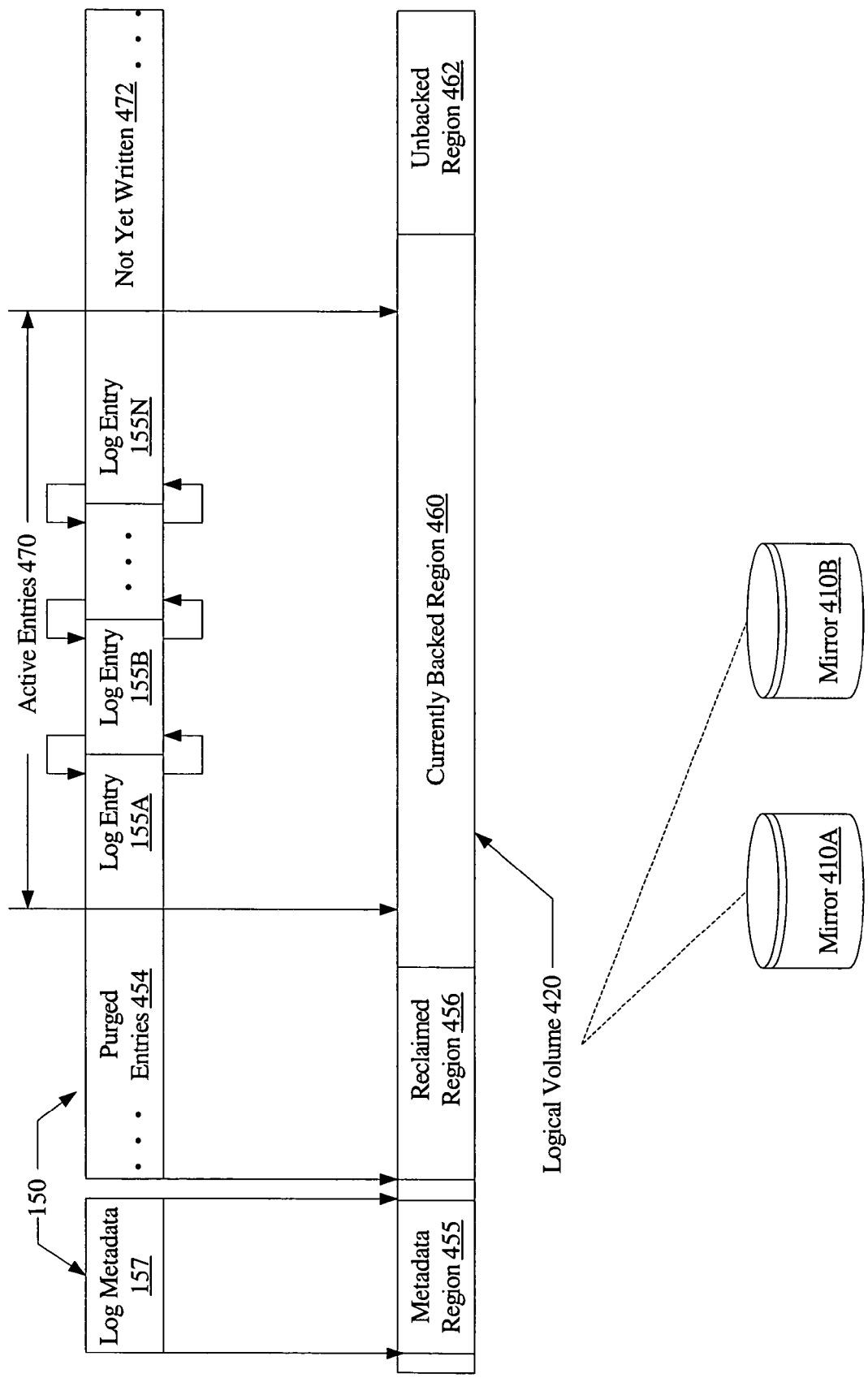
FIG. 4 is a block diagram illustrating a mapping between the constituents of a log-structured storage device and a logical volume according to one embodiment.

According to one embodiment, log-structured storage device 150 may be maintained as a dedicated logical volume, such as a logical volume managed by the VERITAS Volume Manager™ from VERITAS Software Corporation. FIG. 4 is a block diagram illustrating a mapping between the constituents of log-structured storage device 150 and a logical volume 420 according to such an embodiment. As shown, log metadata 157 may map to a metadata region 455 of the logical volume 420, while active log entries 470 may be mapped to a currently backed region 460 of logical volume 420. As obsolete log entries are purged or removed from log-structured storage device 150 (e.g., purged entries 454), the corresponding regions of logical volume 420 (i.e., region 456) may be reclaimed or freed. Such reclaimed or freed entries may be used to back future log entries (e.g., entries from "not yet written" region 472). Logical volume 420 may be implemented as a mirrored logical volume in one embodiment, including two or more mirror devices 410A and 410B. In some embodiments, logical volume 420 may also employ striping, in addition to or in place of mirroring, e.g., for performance reasons. As shown in FIG. 4, the boundaries of currently backed region 460 may not match exactly with the boundaries of active log entries 470 in some embodiments, for example because the size of currently backed region 460 may be modified asynchronously with respect to changes in active log entries 470, and/or because the units in which storage is added or removed from the backed region may differ from the sizes of log entries 155. A variety of allocation policies may be used to manage the size of backed region 460 of logical volume 420 in different embodiments. For example, in one embodiment an allocation policy may include parameters governing the initial size of allocated region 460 and the size of subsequent allocation increments, while in another embodiment an allocation policy may also require that a certain minimum number or proportion of unmapped blocks be maintained ready for newly created log entries 155.

Figure 5:
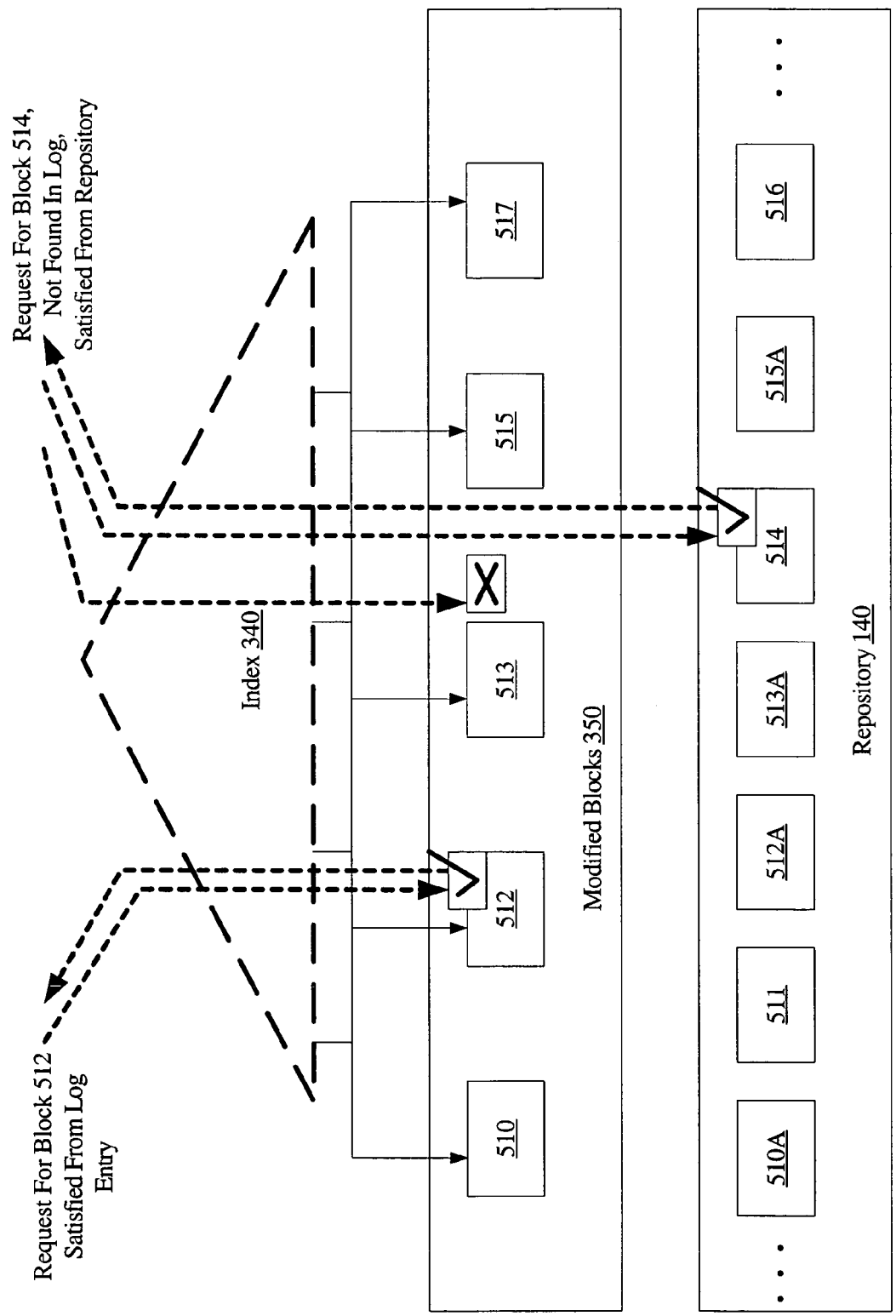
FIG. 5 is a block diagram illustrating the use of an exemplary index of a log entry to access data blocks of a logical storage aggregation according to one embodiment.

FIG. 5 is a block diagram illustrating the use of an exemplary index 340 of a log entry 155 to access data blocks of logical storage aggregation 130, according to one embodiment. As shown, index 340 may contain pointers to several modified blocks, such as blocks at offsets 510, 512, 513, 515 and 517. Repository 140 may contain blocks 510A, 511, 512A, 513A, 514, 515A, and 516, where a block labeled with an "A" (e.g., 510A, 512A, 513A, 515A) represents an older version of the corresponding modified block. If a data consumer requests access to the latest version of block 512, the request may be satisfied by searching for the requested block address within index 340, which may lead to a pointer to the latest version of the block, stored among the modified blocks 350. If the data consumer requests access to the latest version of block 514, a search through index 340 may not find the requested block within log-structured storage device 150, and the request may be satisfied by accessing base repository 140.

Index 340 may be organized as a modified B+ tree (i.e., a variant of a traditional B+ tree structure that differs from a traditional B+ tree in the manner described below) in one embodiment. In general, a B+ tree is a balanced tree index structure that may typically include a root node, one or more levels of interior nodes, and a level of leaf nodes. (If very small amounts of data are being indexed, a B+ tree may consist only of a root node and a level of leaf nodes, or in some degenerate cases of a root node alone.) A characteristic property of a traditional B+ tree is that every path from the root node to a leaf node is of the same length. That is, as the underlying indexed data changes, a B+ tree may be updated (i.e., nodes may be split and/or joined, and the number of interior levels adjusted) so that the tree remains balanced, and the number of levels traversed from a root node to any leaf node remains the same. Each node of a B+ tree includes a number of (key, pointer) pairs.

The organization of index 340 may differ from the traditional B+ tree organization, in that nodes of index 340 may be pruned or removed for space efficiency and reuse in some embodiments. Growth of index 340 may occur in a balanced fashion in such embodiments, but a removal of index nodes from the tree may temporarily result in an unbalanced tree structure. Index 340 may therefore be referred to as a modified B+ tree herein.

Figure 6:
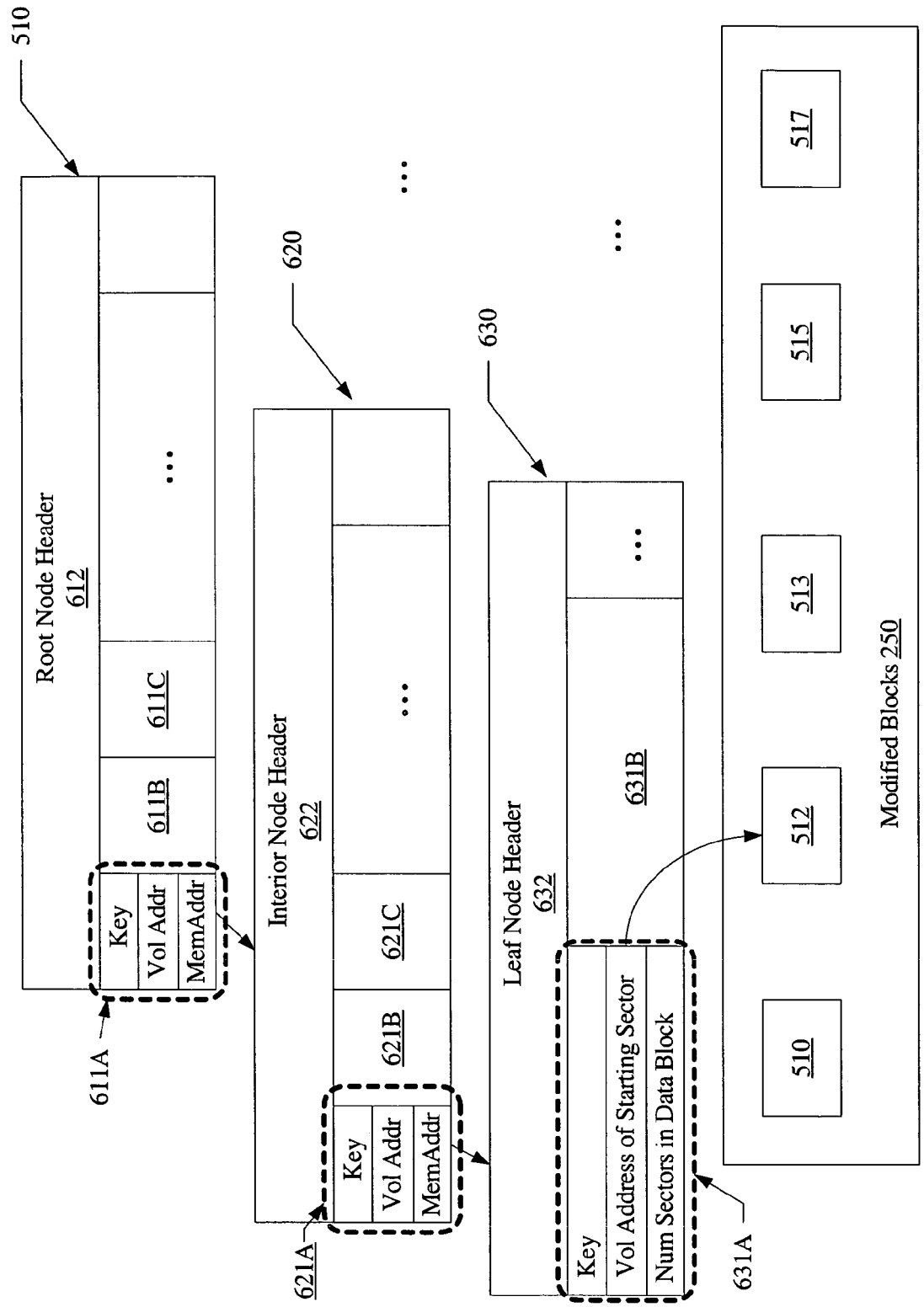
FIG. 6 is a block diagram illustrating nodes at various levels of an exemplary index organized as a modified B+ tree according to one embodiment.

In index 340, the keys within any index node are the block addresses for the blocks of logical storage aggregation 130. The pointers contained within the nodes of index 340 may point either to other nodes of the index (in the case of root nodes and interior nodes of index 340), or they may point to modified data blocks 350 (in the case of leaf nodes of index 340). FIG. 6 is a block diagram illustrating nodes at various levels of an exemplary index 340 organized as a modified B+ tree according to one embodiment. As shown, root node 610 may include a root node header 612 and a set of root node entries 611 (i.e., 611A, 611B, 611C etc.). Similarly, an interior node 620 may include an interior node header 622 and a set of interior node entries 621, while a leaf node 630 may include a leaf node header 632 and a set of leaf node entries 631.

FIG. 7 is a block diagram illustrating the contents of an index node header 710 (i.e., a root node header 612, an interior node header 622, or a leaf node header 632) according to one embodiment. As shown, an index node header may include an indication of the node type 711 (i.e., root vs. interior vs. leaf), and if it is an interior node, the level of the interior node 712 within the index 240. The header may also include an indication of the lowest volume indexed 713 within the index node, and the block offset 714 (e.g., expressed as a sector number) of the lowest-numbered indexed block within the lowest volume. A key-pointer entry count 715 (i.e., the number of key-pointer pairs included within the node) may also be incorporated within an index node header. Finally, in some embodiments, a merge point 716 may also be included within an index node header. Merge point 716 may be a pointer into the log-structured storage device 150, indicative of the latest block merged by repository management software 111, and may be used to prune obsolete entries from index nodes.

Each leaf node entry 631 may include a key and a pointer to a block of logical storage aggregation 130. As described earlier, in general a data block of logical storage aggregation 130 may be addressable using a combination of a volume number and an offset within the volume. In some embodiments, the (key, pointer) pairs included within a single leaf node 630 may be restricted to a single volume, and the volume identifier or volume number may therefore be omitted from a key in a leaf node entry 631. In such embodiments, the key in a leaf node entry 631 may consist only of an offset within the volume, while the volume itself may be identified within the leaf node header (e.g., entry 713 of FIG.

7). In one such embodiment, for space efficiency, the offset may be expressed relative to the lowest block entry 714 for the leaf node 630 (or relative to the key offset of a neighboring leaf node entry), rather than as an absolute offset within the targeted volume of logical storage aggregation 130. In other embodiments, it may be permissible to combine entries for different volumes within a single leaf node 630, in which case both a volume number and a volume offset may be used as a key within a leaf node entry 631. The pointer portion of a (key, pointer) pair within a leaf node entry 631 may be expressed as a volume address, i.e., an offset within volume 420, at which a starting sector of recently-modified data block 350 is located. The total number of sectors within the recently-modified data block 350 may also be included within leaf node entry 631 in some embodiments. As with the offset included within the key, the offset for a pointer may also be expressed as a relative offset with respect to a base offset (e.g., a merge point 716) of currently backed region 460. In some embodiments, for further space efficiency, key and pointer offsets may be stored in a compressed format.

The type of information contained in (key, pointer) pairs stored within non-leaf nodes, i.e., within interior nodes 620 and root nodes 610, may differ from the information contained in (key, pointer) pairs in leaf nodes. For example, the keys of interior and root nodes may not be restricted to a single volume of logical storage aggregation 130, so key values may include volume numbers as well as offsets within volumes. In addition, the pointer values contained in non-leaf nodes may point to other nodes of index 340 rather than to recently modified data blocks 350. For efficient manipulation and traversal of index 340, two kinds of pointer information may be maintained for each key: a volume address of the targeted index node (i.e., an offset within volume 420), and a memory address of the targeted index node. The memory address may, for example, be expressed as a relative node number within the set of nodes of index 340.

Figure 8:
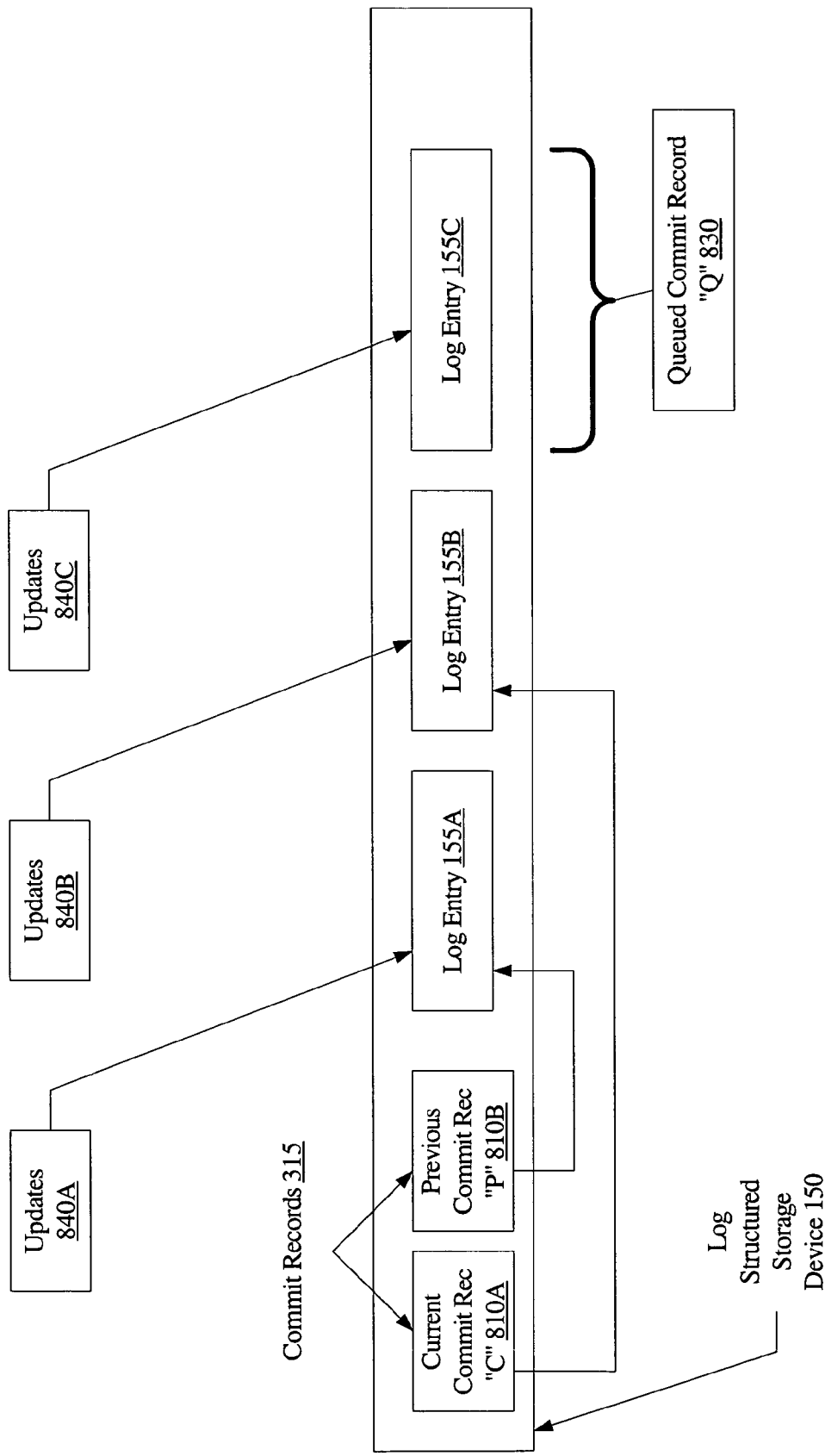
FIG. 8 is a block diagram illustrating dual commit records used to support atomic batch updates according to one embodiment.
Figure 9:
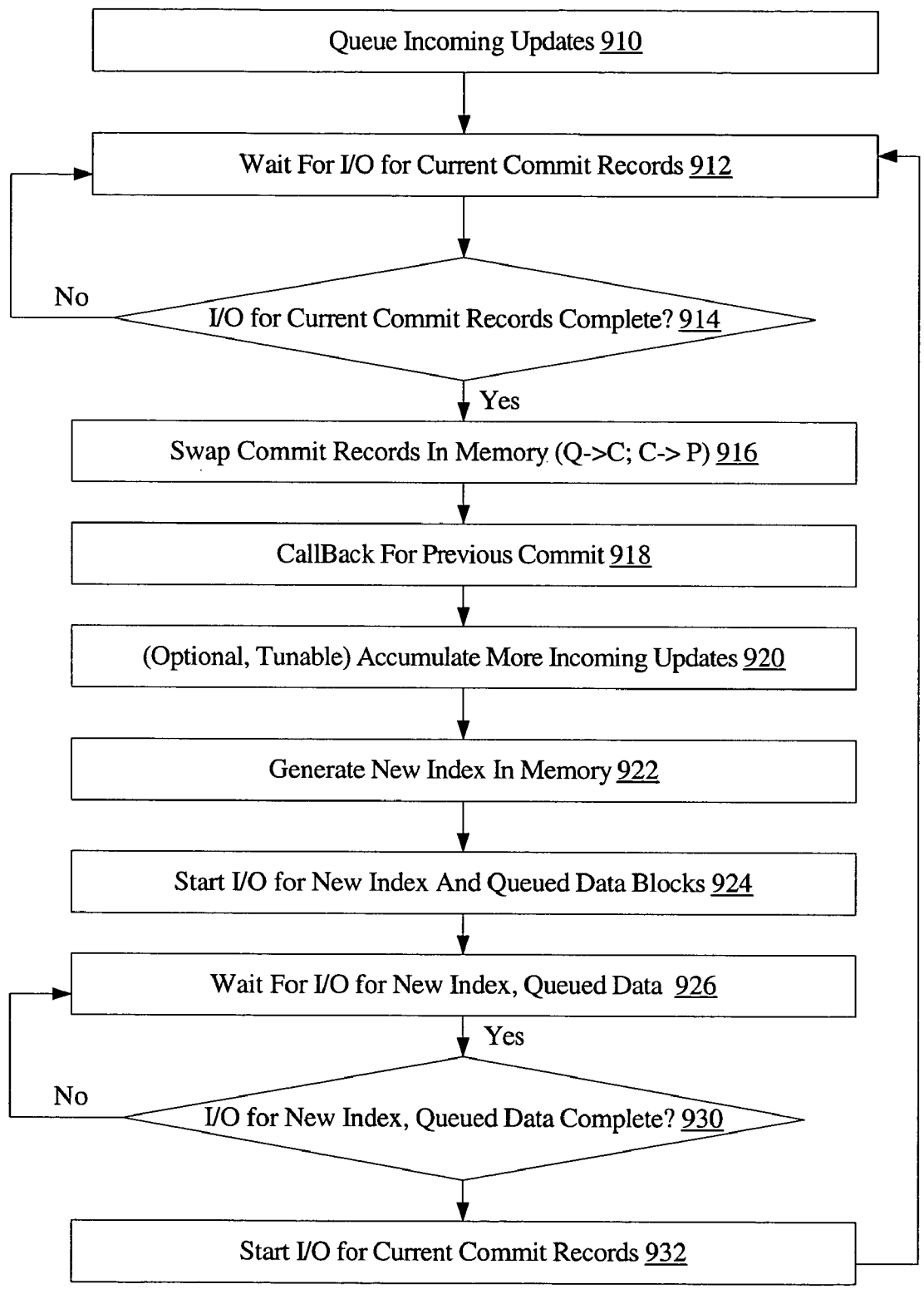
FIG. 9 is a flow diagram illustrating aspects of the operation of shadow management software during a batch update according to one embodiment.

As described previously, shadow management software 110 may be configured to batch updates from data producers 105, and to create a log entry 155 in log-structured storage device 150 for each batch of updates. FIG. 8 is a block diagram illustrating dual commit records 315 that may be used to support atomic batch updates according to one embodiment. FIG. 9 is a flow diagram illustrating aspects of the operation of shadow management software 110 during a batch update according to such an embodiment. As shown in FIG. 8, shadow management software 110 may be configured to maintain two commit records 315 within log-structured storage device 150: a current commit record 810A (which may be referred to as commit record "C") and a previous commit record 810B (which may be referred to as commit record "P"). In addition, a third commit record 830 for queued updates (which may be referred to as commit record "Q") may also be maintained in volatile memory, e.g., at a main memory of a computer server hosting data producer 105. At any given time, current commit record 810A may point to the latest committed log entry (e.g., log entry 155B in FIG. 8), corresponding to a current batch of updates (e.g., updates 840B in FIG. 8), while previous commit record 810B may point to the immediately previous log entry (e.g., log entry 155A) corresponding to a previous batch of updates (e.g., updates 840A).

In handling a given set of updates 840 (e.g., 840A, 840B, etc.), in one embodiment shadow management software 110 may first create a new log segment 155 in memory, and then perform the I/O operations to store the new log segment within a non-volatile backing logical volume 420 (e.g., on mirrored physical storage devices 410). During the time that I/O operations for a current batch of updates (and associated commit records 810A and 810B) are being performed, shadow management software 110 may queue incoming updates (block 910 of FIG. 9), build a corresponding queued commit record 830 in memory, and wait for the I/O operations to complete (block 912). For example, during the time that I/O for batch 840B or log entry 155B is being performed, shadow management software 110 may queue update set 840C. Control may be returned to the requesting data producer 105 after the updates are queued by shadow management software 110, and a callback mechanism may be used to later inform the requesting data producer 105 that its updates have been committed. The requesting data producer may maintain outstanding updates (e.g., in memory buffers) until the outstanding updates are committed. When all I/Os for the current batch are completed (as detected by shadow management software 110 in block 914), shadow management software 110 may swap in-memory versions of commit records (block 916). That is, an in-memory version of previous commit record 810B may be replaced by the contents of current commit record 810A, and an in-memory version of current commit record 810A may be replaced by the contents of queued commit record 830.

Shadow management software 110 may then perform any callback operations associated with the completed I/O operations of the just-completed commit (block 918), e.g., shadow management software may invoke one or more callback routines used to indicate to data producer 105 that its updates have been committed. In one embodiment, if a callback routine for an update or a set of updates is not invoked within a specified timeout interval, the requesting thread or process may treat the absence of a callback as an I/O error, and may resubmit updates for which callback routines have not been invoked. In some embodiments, as described above, the manner in which updates requested by data producer 105 are grouped or batched may be configurable (for example, shadow management software 110 may be configured to create a new log entry only 155 when a certain number of outstanding updates are queued). In such embodiments, shadow management software 110 may be configured to accumulate more incoming updates (block 920), e.g., until a specified number of updates are available for the next log entry 155. Update requests received after the step illustrated in block 920 may be queued for a subsequent commit.

Shadow management software 110 may then generate a new index 340 in memory (block 922). In generating the new index, shadow management software 110 may traverse a current index 340, copying the contents of the current index and creating new versions of index nodes as needed, as described below in further detail in conjunction with the description of FIG. 10. After the new index has been generated, shadow management software 110 may start I/O operations for the new index and queued updated data blocks (block 924). In some embodiments, the I/O operations started at block 924 may be performed in parallel (e.g., using disk striping) in order to reduce the total time taken for all the I/Os to complete. Shadow management software 110 may then wait for the I/O operations for new index and queued updates (block 926). Once the I/O operations are determined to be complete (block 930), shadow management software 110 may start I/O for the current commit records (block 932), i.e., it may write the in-memory version of current commit record 810A and previous commit record 810B to the backing volume 420. Shadow management software 110 may then again wait for the I/Os of the current commit records to complete (block 912).

In some embodiments, a single commit operation may include updates from more than one update source. For example, in one embodiment, a data producer 105 may server as a proxy for a number of different database or file system users or clients, while in another embodiment, multiple data producers 105 may be associated with a single log-structured storage device 150. In some such embodiments, a single queued commit record 830 may be used to commit accumulated changes from a number of different users and/or data producers 105. A batch of updates from different update sources may be stored as separate log entries 155 (e.g., one log entry 155 per update source) in one embodiment, while in other embodiments, a single log entry 155 may be used to combine updates from multiple update sources.

Recovery for log-structured storage device 150, e.g., in the event of a system crash at a data producer, may be performed using the dual commit records 810A and 810B and/or mirrors 410A and 410B of logical volume 420. In one embodiment, during recovery, both commit records 810A and 810B may be read from any one of the mirrors 410A or 410B, and may be copied to the other mirror. Once both mirrors have been synchronized, the latest committed log entry 155 (as identified by current commit record 810A), including a latest committed version of an index 340, may be retrieved, thus restoring the state of log-structured storage device as of the time updates corresponding to the latest committed log entry 155 were saved. In some embodiments, if updated blocks have also been saved (e.g., if the crash occurs after the step illustrated in block 924 of FIG. 9), shadow management software 110 may also recreate a new index 340 using those updated blocks.

Figure 10:
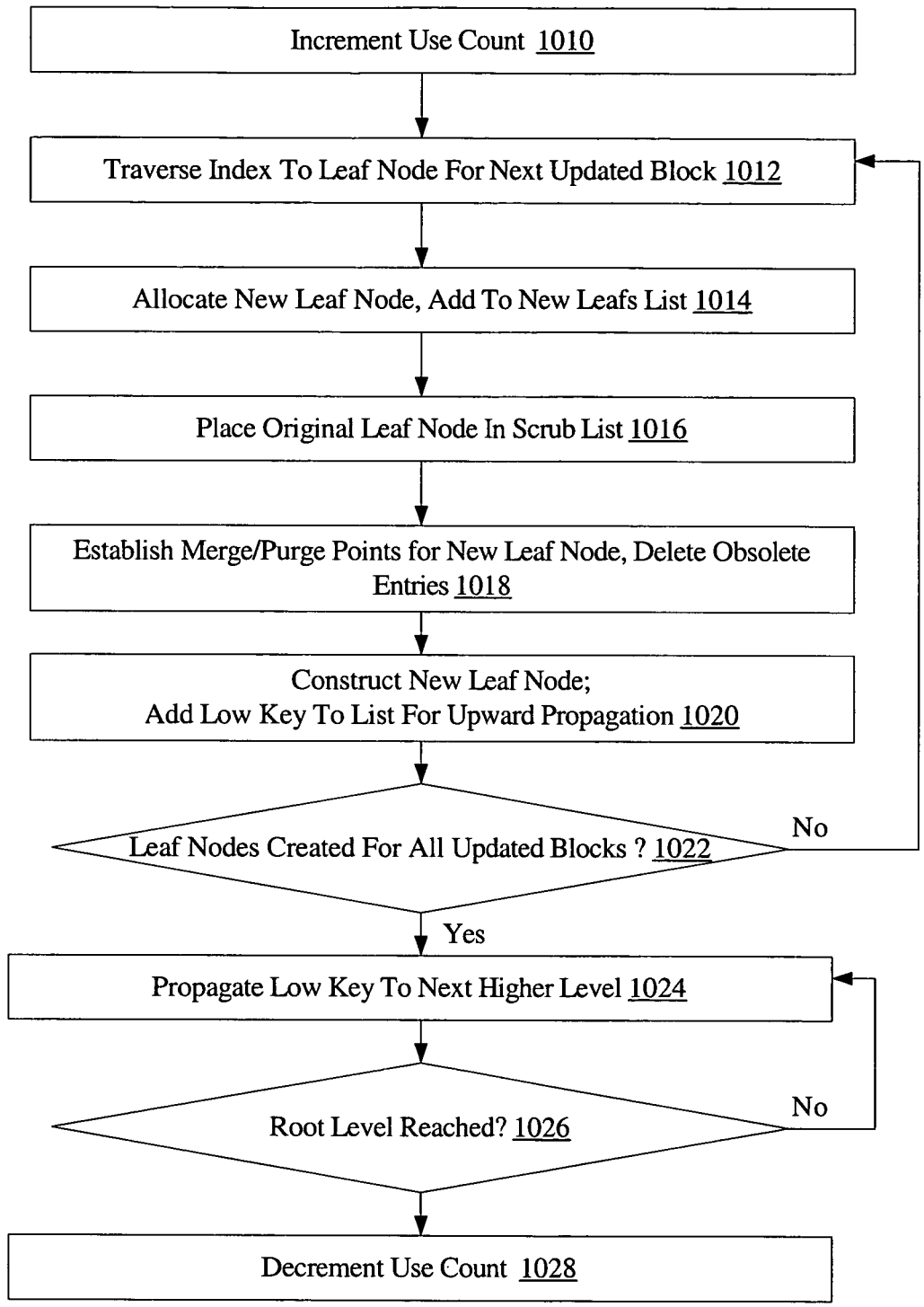
FIG. 10 is a flow diagram illustrating aspects of the operation of shadow management software during a generation of a new index according to one embodiment.

As described above, shadow management software 110 may be configured to generate a new index 340 in memory (block 922 of FIG. 9) while handling a new batch of updates 340. FIG. 10 is a flow diagram illustrating aspects of the operation of shadow management software 110 during such a generation of a new index 340 according to one embodiment. In generating the new index, shadow management software 110 may traverse a current version of index 340, copying the contents of the current index and creating new versions of index nodes as needed. In the illustrated embodiment, shadow management software 110 may be configured to maintain a "use count" for each log entry 155 indicative of the number of concurrent users accessing the log entry, for example in order to ensure that the log entry is not removed from memory while being used. As shown in block 1010, shadow management software 110 may atomically increment the in-use count for the log entry containing the latest committed index 340 (block 1010) prior to traversing the index.

For each updated block 350 among the batch of queued updates (e.g., updates 840C of FIG. 8), shadow management software 110 may then traverse the committed index 340 (block 1012), starting from the root node, and searching for an appropriate leaf index node 630 for the updated block 350. In searching for the appropriate leaf node during its traversal of index 340, shadow management software may select an appropriate child node based on the lowest volume indexed indicator 713 and lowest block offset indicator 714 for the child node. When an appropriate leaf node for the updated block 350 is found, shadow management software 110 may allocate space for a new version of the leaf node (block 1014), and add it to a new leaf nodes list. The original leaf node may be placed in a scrub list (block 1016) for later analysis and potential removal. Based on the current contents of status record 310, a merge-point may then be established for the new version of the leaf node (block 1018), and leaf index entries 631 of the original leaf node that are older than the merge-point may be discarded (i.e., not copied to the new version of the leaf node). The contents of the new leaf node may then be created, e.g., by copying remaining entries from the original leaf node and using the address of the updated block 350 (block 1020). In some cases, depending on the number of non-obsolete entries copied from the original leaf node, a node split may be required at this stage (i.e., two leaf nodes in the new version of the index 340 may replace a single original leaf node). In addition, a new "low key" value (e.g., a new lowest volume indicator 713 and/or a new lowest block offset indicator 714) may be added to a list of low key values for propagation to the upper layers of the new version of index 340. If new leaf nodes have been created for each updated data block 350 (as detected by shadow management software 110 in decision block 1022 of FIG. 10), the accumulated low key values may be propagated up the index 340 (blocks 1024 and 1026). At each level during upwards propagation of new low key values, new versions of interior and/or root nodes may be created, with appropriate merge-points and purge-points for each new node. If, during the upwards traversal, a sub-tree of original index 340 is found to consist of obsolete nodes, the nodes of the sub-tree may be added to a list or queue of obsolete nodes for later removal and/or re-use. In addition, during the upwards propagation of the new low key values, one or more interior nodes and/or a root node of original index 340 may be split. When changes have been propagated all the way to the root node (block 1026), the in-use count for the original index 340 may be atomically decremented (block 1028), and I/O for the new index and updated data blocks 350 may be started (block 924 of FIG. 9).

In some embodiments, obsolete entries of index 340 may be accumulated (for example in one or more queues for each version of index 340) during the creation of a new version of index 340, as described above. In one embodiment, one or more asynchronous components or threads of shadow management software 110 may be configured to perform periodic index cleanup sweeps through such accumulated obsolete index entries, removing and/or reclaiming entries that are no longer in use. The use count information described above may be utilized by such cleanup threads or components in some embodiments to determine whether a particular generation or version of index 340 is still in use.

It is also noted that in one embodiment, not all affected (i.e., dirty or updated) nodes of an index may be written to log-structured storage device 150 within the scope of a given transaction. Instead, in such embodiments, one or more special entries or annotations may be written to log-structured storage device 150 as part of the transaction, where the annotations include enough information to allow the affected nodes to be written later. In some such embodiments, a checkpoint operation may be performed periodically, e.g., by shadow management software 110 automatically or in response to a checkpoint request, to ensure that all dirty nodes have been written to log-structured storage device 150, and a corresponding checkpoint record may be appended to log-structured storage device 150 upon completion of the checkpoint operation.

Repository management software 111 may be configured to merge older updates within log-structured storage device 150 with base repository 140, and to remove or purge merged log entries from log-structured storage device 150 over time. The rates at which updates are merged and/or removed from log-structured storage device 150 may be governed by a number of factors, including the number of concurrent users of log-structured storage device 150, configurable merge policies and/or purge policies, etc. For example, in some embodiments, a merge policy may be in use that requires the base repository 140 to be no more than a specified amount of time (e.g., 30 seconds) "behind" the log-structured storage device 150 (i.e., if a data block 350 is updated at time T, it must be merged within base repository 140 no later than 30 seconds after T). In such an embodiment, repository management software 111 may be configured to select data blocks 350 for merge candidates based on timestamps in the corresponding log entries 155, and copy them to base repository so as not to violate the merge policy. Similarly, among the merged entries of log-structured storage device 150, a purge candidate may be selected by repository management software 111 based on a purge policy, such as a policy that requires that the percentage of logical volume 420 holding merged data blocks may not exceed a specified threshold. In addition to such threshold-based policies, other considerations such as the versions in use by connected users (e.g., data producers and data consumers) may also be considered when selecting merge candidates and purge candidates (for example, if a particular log entry is in use, it may not be purged from log-structured storage device 150). In some embodiments, merging may be temporarily or permanently disabled, or a "null" repository requiring no storage space may be employed, so that I/O activity is restricted to log-structured storage device 150.

It is noted that indexing structures other than the modified B+ trees described above may be used within log-structured storage device 150 in some embodiments. For example, variants of tree indexing structures such as B-link trees, B* trees, R-trees, as well as hash-based indexing techniques may be used in different embodiments.

In general, a data producer 105 may be any device or software module capable of updating a logical storage aggregation 130 as described above, such as a server computer system, including one or more processors and one or more system memories. In some embodiments, multiple clients (such as on-line database users and/or file system users, or front end applications in a multi-tiered application employing a database or a file system) may request updates through a single data producer 105. A single data producer 105 may also utilize multiple log-structured storage devices 150 in some embodiments, for example where updates to a first set of volumes forming a database are handled using a first log-structured storage device, and where updates to a second set of volumes for a file system are handled using a second log-structured storage device. In another embodiment, two or more parallel data producers 105 (e.g., different nodes of a parallel or clustered database system) may be configured to use a single log-structured storage device 150 for a given logical data aggregation 130. In-memory versions of recent updates may be maintained at each such parallel data producer in such embodiments, and shadow management software 110 may be configured to coordinate updates among the parallel data producers (e.g., by broadcasting commit messages to all parallel data producers).

Shadow management software 110 may be included as a layer or component within a volume manager (e.g., a volume manager executing at a data producer server) in one embodiment. In other embodiments, shadow management software 110 may be included as a component within a file system or an operating system, or may be a standalone software product. Similarly, repository management software 111 may also be included as a layer or a component within a volume manager, a file system, or an operating system, or may be a standalone software product. In some embodiments, shadow management software 110 and repository management software may also be bundled together as a single software product.

The physical storage devices used to back log-structured storage device 150 and repository 140 (e.g., physical storage devices 142 and mirrored devices 410) may be any updatable physical storage devices, including disks, disk arrays, intelligent disk arrays, storage appliances, tape devices, optical storage devices, etc. Access to the physical storage devices may be possible via a number of different storage connectivity protocols, such as various versions of Small Computer System Interface (SCSI), fibre channel, Internet SCSI (iSCSI), and the like. The physical storage devices may also be accessible via a storage area network (SAN) or another appropriate network (e.g., using IP), or they may be directly attached to data producers 105.

Various techniques may be used to improve the performance of the operations performed by shadow management software 110 in different embodiments. For example, as described earlier, information within the entries of index 340 may be compressed and/or relative offsets may be used rather than absolute offsets. Index node entries may be restricted to be of a small fixed size (such as 128 bytes) for easy traversal and to increase the fan-out of index 340. Write operations may be page-aligned to prevent a single write operation from being split into multiple physical I/Os, and disk sectors (e.g., to mirrors 410 backing volume 420) may be updated atomically.

Figure 11:
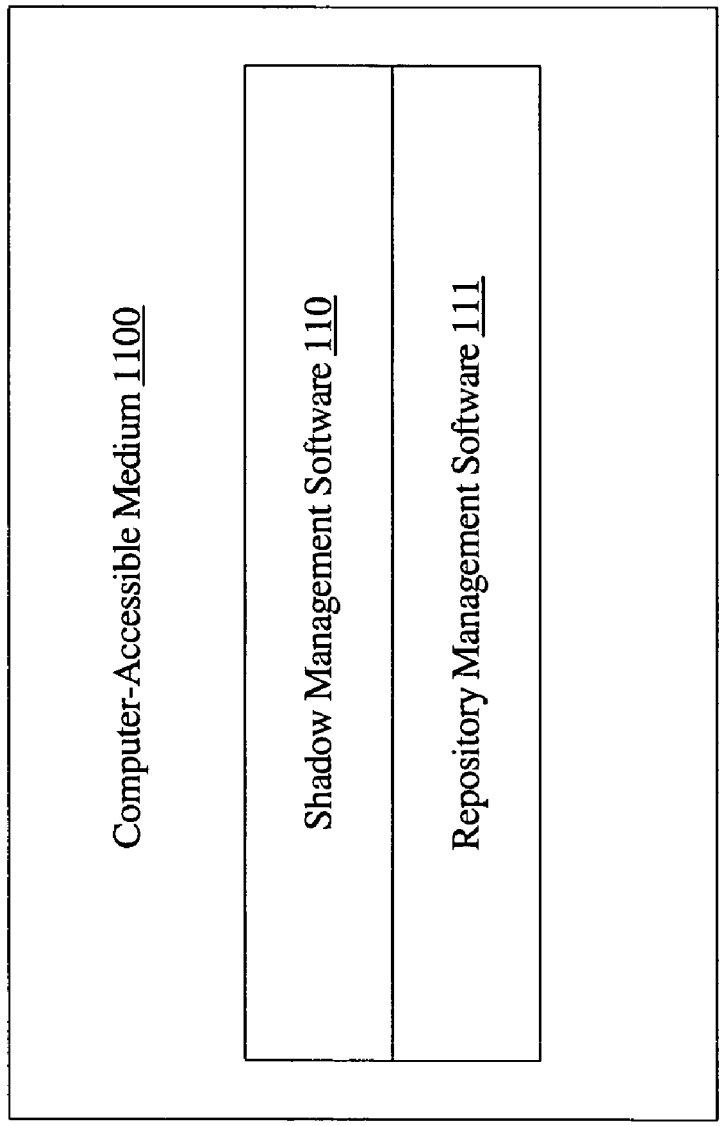
FIG. 11 is a block diagram illustrating a computer-accessible medium according to one embodiment.

FIG. 11 is a block diagram of one embodiment of a computer accessible medium 1100, comprising instructions executable to perform the functions of shadow management software 110 and repository management software 111 described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A shadow store comprising:
   a logical storage aggregation including a plurality of blocks;
   a log-structured storage device; and
   shadow management software,
   wherein the log-structured storage device includes a plurality of log entries;

wherein each log entry of the plurality of log entries comprises one or more modified blocks of the logical storage aggregation and an index to the one or more modified blocks;

and wherein, in response to a new batch of changes to the logical storage aggregation, the shadow management software is configured to append a new log entry to the log-structured storage device, wherein the new log entry comprises one or more newly modified blocks of the logical storage aggregation and a new index to the one or more newly-modified blocks.

2. The shadow store as recited in claim 1, wherein the log-structured storage device further comprises a current-pointer indicative of a current log entry.

3. The shadow store as recited in claim 2, wherein each log entry of the plurality of log entries further comprises a previous-pointer indicative of a previous log entry.

4. The shadow store as recited in claim 3, wherein, in response to the request, the shadow management software is further configured to:
set the previous-pointer of the new log entry to the current log entry; and
set the current-pointer to the new log entry.

5. The shadow store as recited in claim 1, wherein the index within each log entry is organized as a modified B+ tree.

6. The shadow store as recited in claim 1, wherein the logical storage aggregation is a collection of one or more volumes.

7. The shadow store as recited in claim 6, wherein the collection of one or more volumes contains data of a file system.

8. The shadow store as recited in claim 1, wherein the collection of one or more volumes contains one or more database tables and associated metadata.

9. The shadow store as recited in claim 1, wherein the log-structured storage device is a logical volume.

10. The shadow store as recited in claim 1, wherein the log-structured storage device is a mirrored logical volume.

11. The shadow store as recited in claim 1, wherein each log entry of the plurality of log entries includes a timestamp indicative of a time at which a batch of changes is committed.

12. The shadow store as recited in claim 1, wherein the shadow management software is further configured to maintain a use count for each log entry of the plurality of log entries, indicative of a number of concurrent users of the log entry.

13. The shadow store as recited in claim 1, wherein the index at each log entry comprises one or more index entries, and wherein the shadow management software is further configured to copy one or more index entries from a previous log entry to the new index, and to leave out one or more obsolete index entries from the new index.

14. A system comprising:
a logical storage aggregation including a plurality of blocks;
a data producer;
a log-structured storage device; and
a shadow storage manager;
wherein the shadow storage manager is configured to:
maintain one or more entries in the log-structured storage device, wherein each entry of the one or more entries includes one or more modified blocks of the logical storage aggregation and an index to the one or more modified blocks;
and wherein, in response to a new batch of write operations targeted at the logical storage aggregation by the data producer, the shadow storage manager is further configured to append a new entry to the log-structured storage device.

15. The system as recited in claim 14, further comprising a first and a second physical storage device, wherein the log-structured storage device is a mirrored logical volume comprising a first and a second mirror, wherein the first mirror utilizes storage within the first physical storage device, and the second mirror utilizes storage within the second physical storage device.

16. The system as recited in claim 15, wherein, in response to a failure, the shadow storage manager is further configured to:
copy the contents of the current-pointer from the first mirror to the second mirror; and
restore an in-memory copy of an index of the most recently committed entry.

17. The system as recited in claim 15, further comprising a third physical storage device and repository management software, wherein the repository management software is configured to:
maintain a repository containing a baseline version of the logical storage aggregation at the third physical storage device; and
merge an entry of the one or more entries with the repository in accordance with a merge policy.

18. The system as recited in claim 14, wherein the log-structured storage device includes a current-pointer indicative of a most recently committed entry.

19. A method comprising:
maintaining a log-structured storage device including a plurality of log entries, wherein each log entry of the plurality of log entries comprises one or more modified blocks of a logical storage aggregation and an index to the one or more modified blocks; and
responding to a new batch of changes to the logical storage aggregation by appending a new log entry to the log-structured storage device, wherein the new log entry comprises one or more newly modified blocks of the logical storage aggregation and a new index to the one or more newly-modified blocks.

20. The method as recited in claim 19, wherein the index within each log entry is organized as a modified B+ tree.

21. The method as recited in claim 19, wherein the logical storage aggregation is a collection of one or more logical volumes.

22. The method as recited in claim 19, wherein the log-structured storage device is a mirrored logical volume.

23. The method as recited in claim 19, wherein each log entry of the plurality of log entries includes a timestamp indicative of a time at which a batch of changes is committed.

24. A computer-accessible storage medium comprising program instructions, wherein the program instructions are executable to:
maintain a log-structured storage device including a plurality of log entries, wherein each log entry of the plurality of log entries comprises one or more modified blocks of a logical storage aggregation and an index to the one or more modified blocks; and
respond to a new batch of changes to the logical storage aggregation by appending a new log entry to the log-structured storage device, wherein the new log entry comprises one or more newly modified blocks of the logical storage aggregation and a new index to the one or more newly-modified blocks.

25. The computer-accessible storage medium as recited in claim 24, wherein the index within each log entry is organized as a modified B+ tree.

26. The computer-accessible storage medium as recited in claim 24, wherein the logical storage aggregation is a collection of one or more logical volumes.

27. The computer-accessible storage medium as recited in claim 24, wherein the log-structured storage device is a mirrored logical volume.

28. The computer-accessible storage medium as recited in claim 24, wherein each log entry of the plurality of log entries includes a timestamp indicative of a time at which a batch of changes is committed.

* * * * *